United States Patent
Wu et al.

(10) Patent No.: US 9,960,885 B2
(45) Date of Patent: May 1, 2018

(54) METHOD AND APPARATUS FOR HYBRID AUTOMATIC REPEAT REQUESTS (HARQ) PROCESSING FOR RETRANSMISSIONS WITH UNKNOWN DATA LENGTH

(71) Applicant: Samsung Electronics Co., Ltd., Gyeonggi-do (KR)

(72) Inventors: Jinhong Wu, San Diego, CA (US); Mostafa El-Khamy, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 86 days.

(21) Appl. No.: 15/085,388

(22) Filed: Mar. 30, 2016

(65) Prior Publication Data

US 2017/0237528 A1 Aug. 17, 2017

Related U.S. Application Data

(60) Provisional application No. 62/295,732, filed on Feb. 16, 2016.

(51) Int. Cl.
*H04W 4/00* (2009.01)
*H04L 1/18* (2006.01)
*H04L 5/00* (2006.01)

(52) U.S. Cl.
CPC .......... *H04L 1/1822* (2013.01); *H04L 5/0055* (2013.01)

(58) Field of Classification Search
CPC .......................... H04L 1/1822; H04L 5/0055
See application file for complete search history.

(56) References Cited

U.S. PATENT DOCUMENTS

| | | | |
|---|---|---|---|
| 8,065,595 B2 | 11/2011 | Kim et al. | |
| 8,441,981 B2 | 5/2013 | Sidi et al. | |
| 8,761,144 B2 | 6/2014 | Reial et al. | |
| 2003/0138059 A1* | 7/2003 | Xu | H04L 1/0068 375/316 |
| 2005/0232203 A1* | 10/2005 | Ishii | H01L 1/0068 370/335 |
| 2009/0055702 A1* | 2/2009 | Kim | H04L 1/1845 714/748 |
| 2011/0103290 A1* | 5/2011 | Suzuki | H04L 5/0023 370/312 |
| 2011/0269490 A1* | 11/2011 | Earnshaw | H04L 1/0026 455/509 |
| 2012/0236910 A1* | 9/2012 | Mikami | H04L 1/1829 375/219 |
| 2013/0010724 A1* | 1/2013 | Han | H04L 5/0007 370/329 |
| 2014/0086302 A1* | 3/2014 | Felix | H04L 1/1835 375/240 |
| 2014/0376469 A1* | 12/2014 | Zhang | H04L 1/1845 370/329 |
| 2015/0071209 A1* | 3/2015 | Chae | H04L 1/1887 370/329 |
| 2017/0187488 A1* | 6/2017 | Rico Alvarino | H04L 1/0041 |

* cited by examiner

*Primary Examiner* — Clemence Han
(74) *Attorney, Agent, or Firm* — The Farrell Law Firm, P.C.

(57) ABSTRACT

A system, method and device for wireless communication is provided. The method includes receiving, by a receiver, data from a wireless transmitter, receiving, by the receiver, retransmission of the data from the wireless transmitter, storing, by the receiver, the data, processing, by the receiver, the data without knowledge of the data length, and determining, by the receiver, a data length of the data.

20 Claims, 6 Drawing Sheets

METHOD AND APPARATUS FOR HYBRID AUTOMATIC REPEAT REQUESTS (HARQ) PROCESSING FOR RETRANSMISSIONS WITH UNKNOWN DATA LENGTH

PRIORITY

This application claims priority under 35 U.S.C. § 119(e) to U.S. Provisional Patent Application No. 62/295,732, which was filed in the U.S. Patent and Trademark Office on Feb. 16, 2016, the content of which is incorporated herein by reference.

FIELD

The present disclosure generally relates to a method and apparatus for wireless communication, and more particularly, to a method and apparatus for hybrid automatic repeat requests (HARQ) processing for retransmissions with unknown data length.

BACKGROUND

Users of electronic devices require increasing functionality in the applications and services provided by the electronic devices and communication networks used to connect those devices. Increasing the bandwidth and reliability of the wireless communications used to connect the electronic devices to other electronic devices and communications networks is of increasing importance for user satisfaction. One of the challenges faced by wireless communication receivers in electronic devices is extracting the transmitted data from received wireless signals with reduced errors. A technique used by receivers to reduce transmission errors is hybrid automatic repeat requests (HARQ). HARQ is a combination of high data rate forward error-correcting coding and automatic repeat request error-control.

SUMMARY

The present disclosure has been made to address the above problems and disadvantages and to provide at least the advantages described below.

According to an aspect of the present disclosure, in a wireless communication system, retransmissions of the same transport blocks performed by the transmitter have the option of either being controlled by an acknowledgement/negative acknowledgement (ACK/NACK) mechanism or being mandatory regardless of the receiver correctly receiving the transport blocks without errors. Furthermore, the data length of the transport block before encoding may be unknown to the receiver, which requires more adaptive HARQ processing and storage buffer management.

According to an aspect of the present disclosure, a method for wireless communication is provided. The method includes receiving, by a receiver, data from a wireless transmitter, receiving, by the receiver, retransmission of the data from the wireless transmitter, storing, by the receiver, the data, processing, by the receiver, the data without knowledge of the data length, and determining, by the receiver, a data length of the data.

According to an aspect of the present disclosure, a device for wireless communication is provided. The wireless communication device includes a receiver and a storage, wherein a transmitter transmits data to the receiver and retransmits the data to the receiver, the storage stores the received data, and the receiver processes the received and stored data without knowledge of a data length and determines the data length of the data.

According to an aspect of the present disclosure, a chipset for controlling a user equipment (UE) in a mobile communication system is provided. The chipset configured to receive data transmitted by a wireless transmitter, receive the data retransmitted by the wireless transmitter, store the data, process the data without knowledge of the data length, and determine a data length of the data.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

Figure 1:
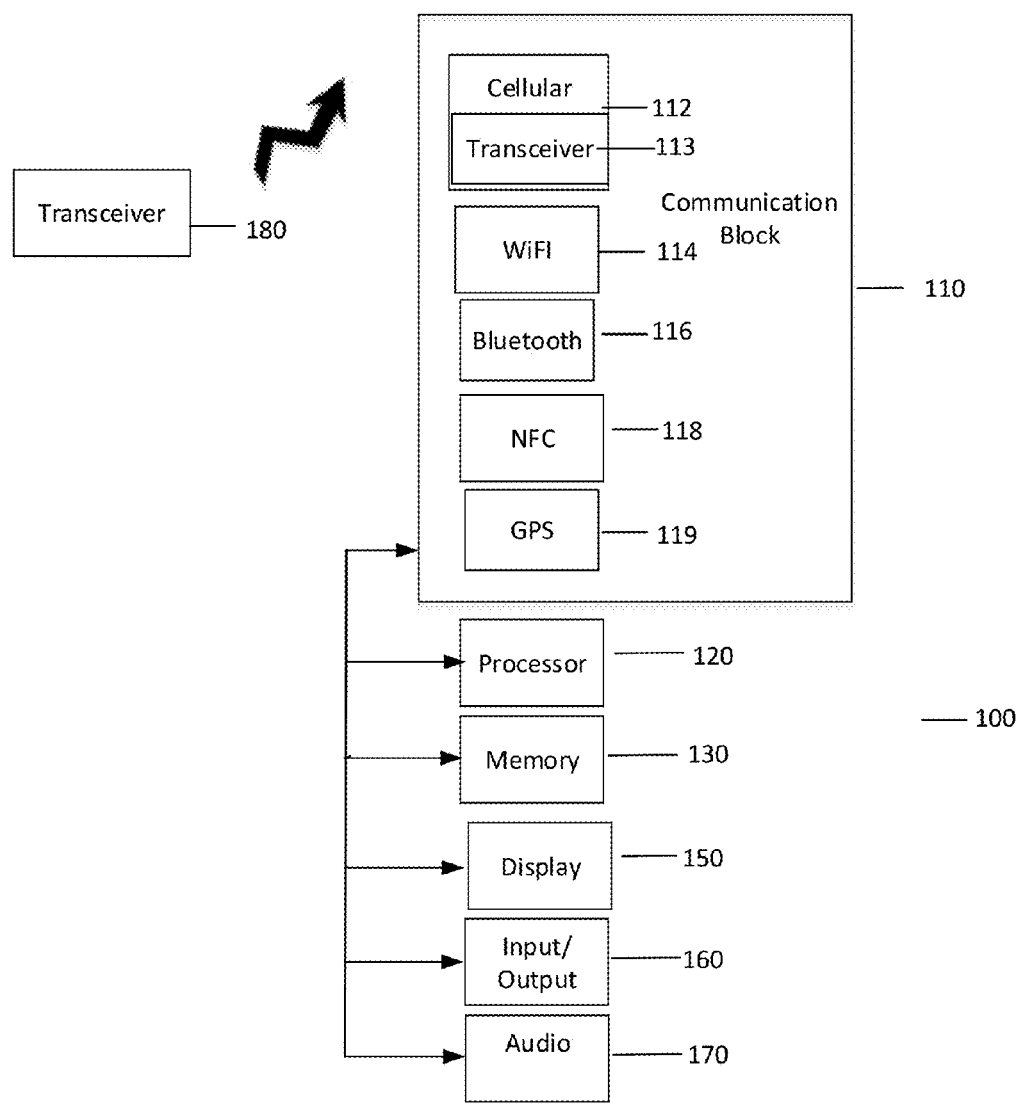
FIG. 1 is a schematic block diagram of an electronic device in a network environment, according to an embodiment of the present disclosure.

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. In the drawings, the size and relative sizes of layers and regions may be exaggerated for clarity. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly, a second signal may be referred to as a first signal without departing from the teachings of the disclosure.

The terminology used herein is for the purpose of describing particular embodiments only and is not intended to be limiting of the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

FIG. 1 is a schematic block diagram of an electronic device in a network environment, according to an embodiment of the present disclosure. An electronic device 100 in a network environment includes a communication block 110, a processor 120, a memory 130, a display 150, an input/output block 160, an audio block 170 and a transmitter 180.

The electronic device 100 includes, but is not limited to, a communication block 110 for connecting the device 100 to another electronic device or a network for communication of voice and data. The communication block 110 provides wide area, local area, personal area, near field, device to device (D2D), short range communications, and machine type communications (MTC). The functions of the communication block 110, or a portion thereof, may be implemented by a chipset. In particular, the cellular communications block 112 provides a wide area network connection through terrestrial base transceiver stations or directly to other electronic devices, using technologies such as D2D, MTC, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for global system for mobile communication (GSM). The cellular communications block 112 includes, but is not limited to, a chipset, a receiver 113 which may include a low noise amplifier, a demodulator, a detector, a descrambler, a deinterleaver, a HARQ processor, a rate dematcher, and a channel decoder. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes, but is not limited to, a GPS satellite signal receiver 119. The GPS receiver 119 provides for receiving Global Positioning System signals in order to compute the device's absolute position, velocity, acceleration and time. The electronic device 100 may receive electrical power for operating the functional blocks from a battery. The transmitter 180 may include a base transceiver station (BTS) or a user equipment (UE).

The processor 120 provides application layer processing functions required by the user of the electronic device 100. The processor 120 also provides command and control functionality for the various blocks in the electronic device 100. The processor 120 provides updating control functions required by the functional blocks. The processor 120 may provide for coordination of resources required by the receiver 113 including communication control between the functional blocks. The processor 120 may also update the firmware, databases and libraries associated with the receiver 113. The cellular block 112 may also have a local processor or a chipset which dedicates computing resources to the receiver 113 and other functional blocks required for cellular communication.

The memory 130 provides storage for device control program code, user data storage, application code and data storage. The memory 130 may provide data storage for the firmware, libraries, databases, look up tables and calibration data required by the receiver 113. The databases may include look up tables, and the like. The program code and databases required by the receiver 113 may be loaded into local storage within the receiver 113 from the memory 130 upon device boot up. The receiver 113 may also have local non-volatile memory for storing the program code, libraries, databases and look up table data.

The sensor block 140 may contain physical sensing devices for sensing physical conditions internal and external to the electronic device 100. The sensor block 140 may also contain electronic conditioning circuits and software control for manipulating sensor data and making it available to the other blocks in the electronic device 100.

The display 150 may be a touch panel, and may be embodied as a liquid crystal display (LCD), a light emitting diode (LED) display, an organic light emitting diode (OLED) display, an active matrix light emitting diode (AMOLED) display, and the like. The input/output block 160 controls the interface to the user of the electronic device 100. The audio block 170 provides for audio input and output to/from the electronic device 100.

According to an embodiment of the present disclosure, a HARQ process between a user equipment (UE), (for example, the electronic device 100) and a transmitter 180 in a cellular communications network (e.g., in a 3GPP data channel) has certain fixed transmission parameters and procedures required to ensure interoperability and reliable communications. First, in a HARQ process for a data channel, an acknowledgement (ACK) or negative-acknowledgment (NACK) signal is transmitted from the cellular communications block 112 in the UE to the transmitter 180 to signal to the transmitter 180 whether a transport block was received correctly (without errors) or received incorrectly (with errors). In the case where the transport block was received incorrectly, a subsequent retransmission of the transport block is required. Secondly, for each retransmission of a transport block, the code word format and size are known to the receiver 113, which determines the size of the HARQ buffer based on the code word length after rate dematching. The receiver 113 may perform rate dematching to recover the mother code format, and if the current transport block transmission is the first transmission, the receiver 113 stores the rate dematched data in a HARQ buffer, while for retransmissions of a transport block (a transport block that was received with errors and therefore required retransmission after a NACK was transmitted to the transmitter 180), the receiver 113 performs soft HARQ combining of rate dematched data between a subsequent new transmission and previous transmissions.

According to an embodiment of the present disclosure, the present system includes, but is not limited to, a receiver 113 that stores received transport blocks from previous transmissions that were received with errors and performs HARQ combining with a current transport block transmission without knowledge of the data length or format. In an embodiment of the present disclosure, transmitting, receiving, storing, and processing of data refers to coded data (after applying coding of information data). The data length of the data further refers to the length of uncoded information data. For example, the information data is 1010, if the coding scheme is to repeat every bit 3 times, then the coded data becomes 111000111000. The receiver 113 may include, but is not limited to, a single HARQ buffer for storing previous transport block transmissions. The receiver 113 may further include a decoder to perform blind decoding for either individual transport block transmissions or multiple transport block retransmissions after soft combining. The receiver 113 may further determine the data length and format from a given set of candidate data lengths and formats after blind decoding.

According to an embodiment of the present disclosure, the present system and method allows retransmissions of the same transport blocks transmitted by the transmitter 180 to have the option of either being controlled by an ACK/NACK feedback mechanism or being mandatory regardless of the receiver 113 correctly receiving the transport blocks without errors. Furthermore, the data length before encoding may be unknown to the receiver 113, which requires more adaptive HARQ processing and HARQ buffer management within the receiver 113.

Figure 2A:
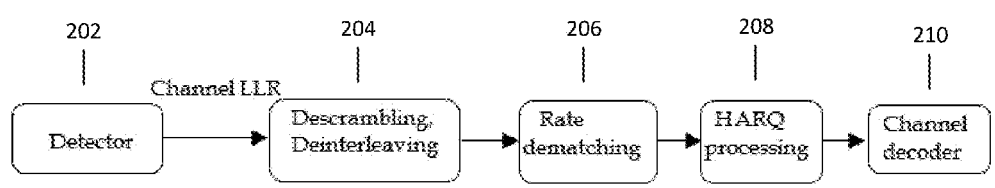
FIG. 2A is a block diagram of a portion of a receiver for wireless communication, according to an embodiment of the present disclosure.

FIG. 2A is a block diagram of a portion of a receiver for wireless communication, according to an embodiment of the present disclosure. FIG. 2A illustrates a block diagram of a receiver 113 with HARQ processing for a fixed and known data length. Referring to FIG. 2A, a detector 202 outputs log likelihood ratios (LLRs) of received transport blocks, a descrambler/deinterleaver 204 processes the LLRs from the detector 202, rate dematching 206 is performed to recover a mother code format. HARQ processing 208 is further performed. If the current transmission is the first transmission, the rate dematched data is stored in a HARQ buffer. For retransmissions, soft HARQ combining of the rate dematched data between a new transmission and previous transmissions is performed. Channel decoding 210 is further performed on the HARQ processed data.

Figure 2B:
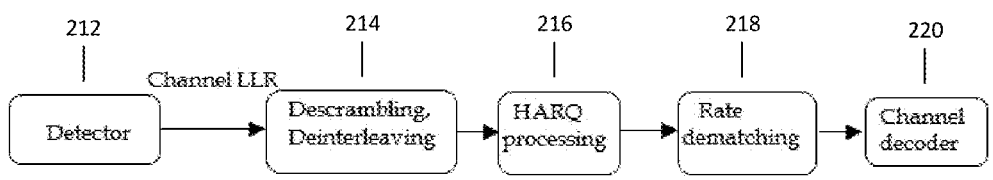
FIG. 2B is a block diagram of a portion of a receiver for wireless communication, according to another embodiment of the present disclosure.

FIG. 2B is a block diagram of a portion of a receiver for wireless communication, according to another embodiment of the present disclosure. FIG. 2B illustrates a block diagram of a receiver 113 with HARQ processing for an unknown data length. Referring to FIG. 2B, a detector 212 outputs log likelihood ratios (LLRs) of received transport blocks, a descrambler/deinterleaver 214 processes the LLRs from the detector 212, HARQ processing 216 is performed on the descrambled/deinterleaved data. Rate dematching 218 is performed on the HARQ processed data. Channel decoding 220 is further performed on the rate dematched data. In HARQ processing for an unknown data length, the sequence of HARQ processing and rate dematching is reversed from processing for a fixed and known data length.

According to an embodiment of the present disclosure, the present system includes, but is not limited to, a HARQ buffer that is configured to store each transport block transmission's detector output log likelihood ratios (LLRs) before rate dematching, which avoids deciding on a fixed data length. Blind decoding is performed on the same LLRs stored in the HARQ buffer as follows: One decoding attempt or one set of decoding attempts is made for each data format by which LLRs are rate dematched according to that data length (hence its code length and other associated parameters). After blind decoding, when multiple decoding attempts pass cyclic redundancy check (CRC) or another error detection criteria, data length selection is determined based on simple metrics by performing calculations on input/output data provided by the decoder, in order to choose one data length.

According to an embodiment of the present disclosure, the present system includes, but is not limited to, a receiver 113 that stores received transport blocks from previous transmissions and performs HARQ combining with a current transport block transmission without knowing the data length. The data length is further determined from a given set of candidate data lengths after blind decoding. The present system and method processes HARQ storage, soft combining, blind decoding, and data length selection of transport blocks received from multiple transmissions without knowing the data length.

According to an embodiment of the present disclosure, HARQ provides an error detection and control method for data transmission where the receiver 113 transmits an ACK (received without errors) or NACK (received with errors) to the transmitter 180, so that the transport block is retransmitted upon the transmitter 180 receiving a NACK message. The receiver 113 stores the received transport block from each transmission such that upon each retransmission, signals from all transmissions may be combined for detection or decoding.

According to an embodiment of the present disclosure, HARQ may be implemented using chase combining (CC) and incremental redundancy (IR). In CC, the transmitter 180 retransmits the same transport block with the same encoding parameters, while in IR, the transmitter 180 may choose to retransmit the transport block with different encoding parameters than a given mother code. In both CC and IR, the information data length is known to the receiver 113. Based on the known data length, the receiver 113 may perform rate dematching on the received transport block of each transmission and store the result (or may also combine the result with previously stored, rate dematched, transport blocks from previous transmissions) in the same format as the mother code.

According to an embodiment of the present disclosure, the transmitter 180 may transmit encoded transport blocks with a data length chosen from a set of candidate lengths that is unknown to the receiver 113. Furthermore, the transmitter 180 may choose to retransmit the same transport block multiple times in order to achieve desired quality of service (QOS) performance metrics. The retransmission may or may not depend on the receiver's 113 feedback signaling such as ACK/NACK to the transmitter 180. When ACK/NACK feedback is not signaled to the transmitter, the retransmission may occur multiple times according to system requirements and restrictions related to QOS, radio bearer selection and available bandwidth. A HARQ storage and soft combining method is required for efficient receiver 113 processing. HARQ storage and soft combining may be independent of the data length or format and decoding may be carried out upon receiving the last transport block transmission.

According to an embodiment of the present disclosure, the present system allows the receiver 113 to store the received transport block from each transmission without knowing the data length or format, perform soft combining between signals received from different transmissions without knowing the data length or format, perform blind decoding, and also identify the data length and format.

According to an embodiment of the present disclosure, in a transmitter 180, transport blocks are encoded by a forward error control coding scheme, and after optional operations such as interleaving and scrambling, are followed by modulation and transmission over the air. The transport blocks may further contain cyclic redundancy check (CRC) bits for error detection. The receiver 113 correspondingly performs detection on the received transport block, which after optional descrambling and de-interleaving in accordance with the transmitter 180 operation, is followed by the present HARQ processing method.

Figure 3:
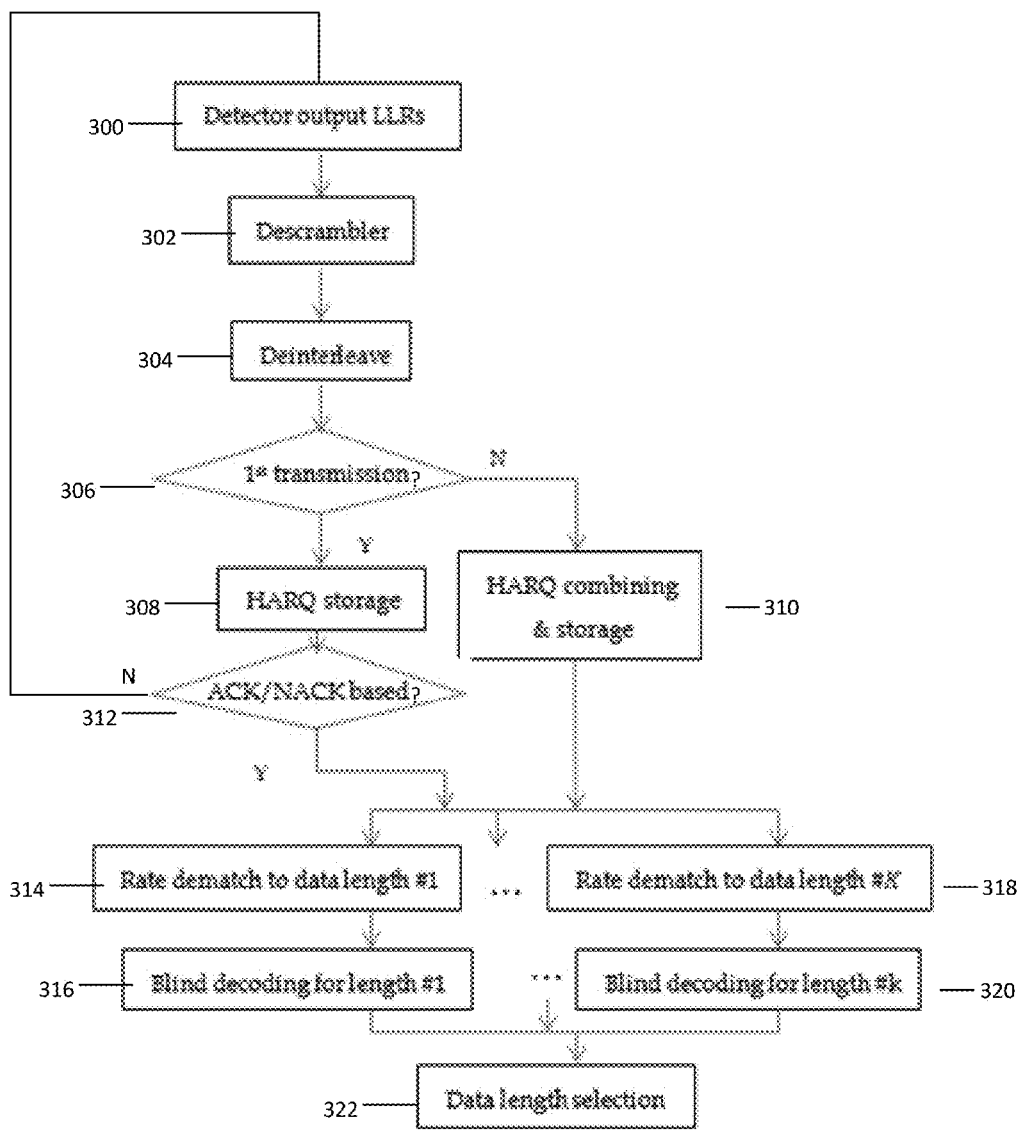
FIG. 3 is a flowchart illustrating an operation of HARQ processing, according to an embodiment of the present disclosure.

FIG. 3 is a flowchart illustrating an operation of HARQ processing, according to an embodiment of the present disclosure. FIG. 3 is a flowchart for an operation of HARQ processing and blind decoding for a desired number (e.g., K number) of possible information data lengths, according to an embodiment of the present disclosure.

Referring to FIG. 3, a transmitter 180 transmits encoded transport blocks with information data length chosen from K possible lengths. The receiver 113 receives the encoded transport blocks. At 300, the receiver 113's detector outputs the log likelihood ratios of the received transport blocks. At 302, descrambling of the LLR values from the detector is performed and at step 304 deinterleaving of the descrambled LLR values from the descrambler is performed. At 306, it is determined if the transmission is the first transport block transmission. If it is determined to be the first transmission, at 308, the receiver 113 stores the data in the HARQ buffer. If an ACK/NACK mechanism is used, as determined at 312, the receiver performs rate dematching K times, once for each possible data length at 314 to 318 (e.g., data length number 1, data length number 2 . . . data length number k). At 316 to 320, the receiver performs blind channel decoding for each possible data length at 314 to 318 respectively. At 322, the receiver performs a data length selection after decoding for all possible data lengths. If ACK/NACK mechanism is not used as determined at 312, the receiver waits for subsequent retransmissions. If the transmission is a retransmission and not the first transport block transmission, as determined at 306, the received transport block is soft combined with the stored transport blocks from the previous transmissions at 310. The receiver 113 then performs rate dematching K times, once for each possible data length at 314 to 318 (e.g., data length number 1, data length number 2 . . . data length number k). At 316 to 320, the receiver performs blind channel decoding for each possible data length at 314 to 318 respectively. At 322, the receiver performs a data length selection after decoding for all possible data lengths. The term "blind" refers to the fact that the data length, as well as other decoding parameters associated with the received transport block, are unknown. For example, specific data format(s) fitting the data length, a possible scrambling sequence applied to the CRC parity bits, and an exact location of the candidate code word in the HARQ buffer are unknown. The blind decoding attempts are made once, assuming one set of decoding parameters. This is conditional on one data length and fixed candidate code word location. When there are multiple candidate data formats or candidate scrambling sequences for the CRC parity bits, only one decoding attempt is needed. When the exact location of the candidate code word in the HARQ buffer is unknown, multiple decoding attempts may be needed once for each possible location. After the decoding attempt(s) for each candidate data length, other post-processing will be performed to identify these associated parameters. After all K decoding attempts, or K sets of decoding attempts are finished, data length selection will be performed at 322 to determine the data length, as well as other related parameters.

Data length selection at 322 may be performed by simple calculation of metrics based on statistics obtained from the decoding process. For example, a normalized soft correlation metric (NSCM) may be defined in Equation (1) as follows:

$$NSCM = \frac{1}{NORM} \sum_{i=0}^{L-1} llr_i \hat{x}_i \qquad (1)$$

where $llr_i$ and $\hat{x}_i$ denote the i-th input LLR after rate dematching and the i-th bit of the re-encoded code word for the information data, L is the length of the mother code. If NORM is set in Equation (2) as follows:

$$NORM = \sum_{i=0}^{L-1} |llr_i| \qquad (2)$$

which is to normalize with the L1-norm and may be referred to as L1-NSCM. If NORM is used in Equation (3) as follows:

$$NORM = \sqrt{L \sum_{i=0}^{L-1} |llr_i|^2} \qquad (3)$$

which is the L2-norm, the metric may be referred to as L2-NSCM. When channel decoding passes CRC (or other error detection criteria) for multiple candidate data lengths, data length selection is carried out by comparing the NSCM values and the one with largest NSCM value is selected as the data length.

According to an embodiment of the present disclosure, instead of using one HARQ buffer for storage before performing rate dematching, multiple HARQ buffers may be used after rate dematching, one for each candidate data length. Receiver 113 processing may include performing of HARQ processing before rate dematching, as shown in the steps illustrated in FIG. 2B.

Figure 4:
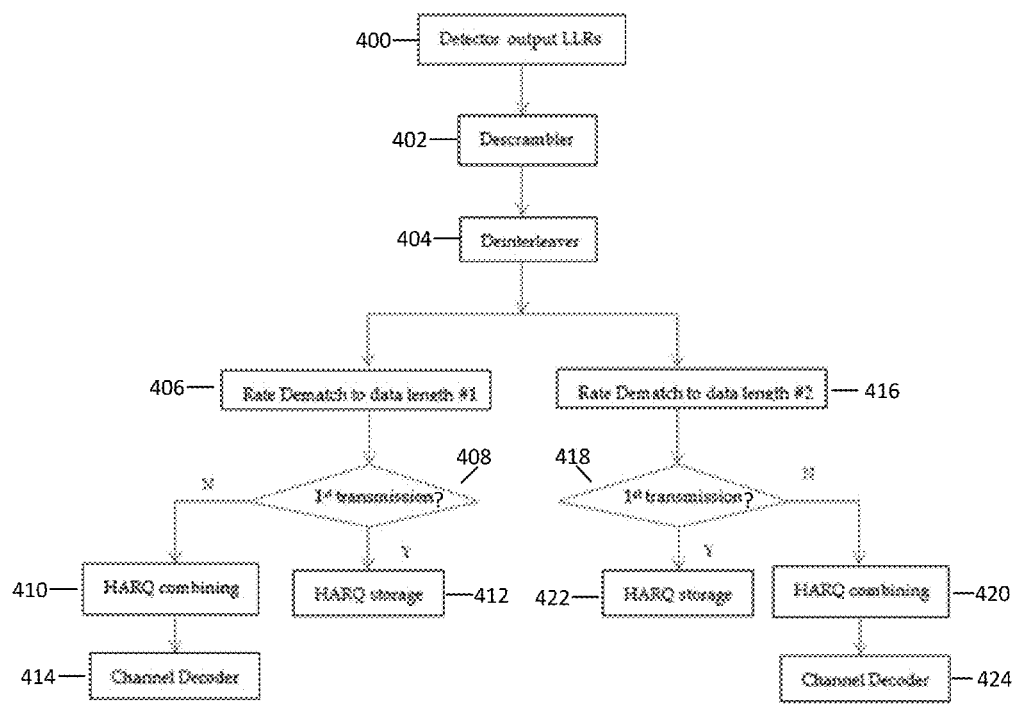
FIG. 4 is a flowchart illustrating an operation of HARQ processing, according to another embodiment of the present disclosure.

FIG. 4 is a flowchart illustrating an operation of HARQ processing, according to another embodiment of the present disclosure. FIG. 4 is a flowchart illustrating an operation for processing multiple HARQ buffers for storage of rate dematched transport blocks with multiple data lengths. Referring to FIG. 4, a transmitter 180 transmits encoded transport blocks. The receiver 113 receives encoded transport blocks. At 400, the receiver 113's detector outputs the log likelihood ratios of the received transport blocks. At 402, descrambling of the LLR values from the detector is performed and at step 404 deinterleaving of the descrambled LLR values from the descrambler is performed. The receiver 113 processes 2 possible data lengths at 406 and 416, however, the receiver is not limited to processing 2 data lengths and may process multiple data lengths greater than 2 without deviating from the scope of the present disclosure. At 406, rate dematching is performed for data length number 1. At 408, it is determined if the transmission is the first transport block transmission. If the transmission is determined to be the first transmission, at 412, the receiver 113 stores the transport block in the HARQ storage buffer. If the transmission is a retransmission, and not the first transport block transmission, as determined at 408, the received transport block is soft combined with the stored transport blocks from the previous transmissions at 410, At 414, the receiver performs channel decoding for data length number 1. At 416, rate dematching is performed for data length number 2 which is a different data length than data length number 1. At 418, it is determined if the transmission is the first transport block transmission. If the transmission is determined to be the first transmission, at 422, the receiver stores the data in the HARQ storage buffer. If the transmission is a retransmission, and not the first transport block transmission, as determined at 418, the received transport block is soft combined with the stored transport blocks from the previous transmissions at 420. At 424, the receiver performs channel decoding for data length number 2.

According to another embodiment of the present disclosure, instead of performing HARQ processing before rate dematching, rate dematching may be performed before HARQ processing as shown in FIG. 2A.

Figure 5:
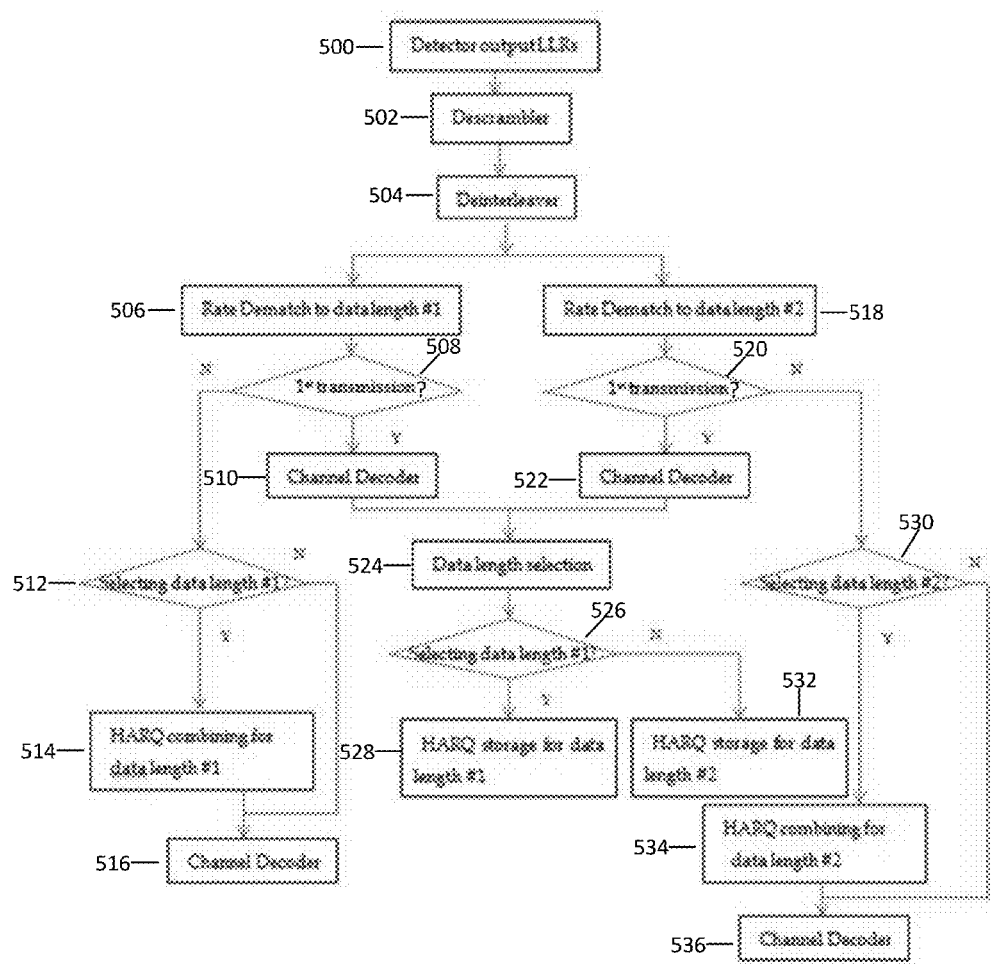
FIG. 5 is a flowchart illustrating an operation of HARQ processing, according to another embodiment of the present disclosure.

FIG. 5 is a flowchart illustrating an operation of HARQ processing, according to another embodiment of the present disclosure. FIG. 5 is a flowchart illustrating an operation for receiver 113 processing with single HARQ buffer and data length selection, however rate dematching is performed multiple times, once for each candidate data length. Referring to FIG. 5, a transmitter 180 transmits encoded transport blocks. The receiver 113 receives encoded transport blocks. At 500, the receiver 113's detector outputs the log likelihood ratios of the received transport blocks. At 502, descrambling of the LLR values from the detector is performed and at step 504 deinterleaving of the descrambled LLR values from the descrambler is performed. The receiver 113 processes 2 possible data lengths at 506 and 518. At 506, rate dematching is performed for data length number 1. At 508, it is determined if the transmission is the first transport block transmission. If the transmission is determined to be the first transmission, at 510 the first transport block is decoded. For the first transmission, decoding is performed to enable data length selection by the method described above, e.g., by comparing NSCM values at 524. If the data length is selected as number 1, as determined at 526, a single HARQ buffer is used to store the rate dematched transport block according to the selected data length number 1 at 528. If the data length is not selected as number 1, as determined at 526, a single HARQ buffer is used to store the rate dematched transport block according to the selected data length number 2 at 532. If the rate dematching is performed for data length number 1 at 506 and the transmission is a retransmission, as determined at 508, and data length is selected as length number 1 at 512, the received transport block is soft combined with the LLRs stored in the HARQ buffer from the previous transmissions at 514. At 516, the receiver provides channel decoding for the data length number 1. If the data length is not selected as number 1 at 512, the receiver performs channel decoding at 516. If the rate dematching is performed for data length number 2 at 518 and the transmission is a retransmission, as determined at 520, and data length is selected as length number 2 at 530, the received transport block is soft combined with the LLRs stored in the HARQ buffer from the previous transmissions at 534. At 536, the receiver performs channel decoding for the data length number 2. If the data length is not selected as number 2 at 530, the receiver performs channel decoding at 536. At 520, if the transmission is determined to be the first transmission, at 522 the received transport block is decoded. For the first transmission, decoding is performed to enable data length selection by the method described above, e.g., by comparing NSCM values at 524. If the data length is selected as number 1, as determined at 526, a single HARQ buffer is used to store the rate dematched transport block according to the selected data length number 1 at 528. If the data length is not selected as number 1, as determined at 526, a single HARQ buffer is used to store the rate dematched transport block according to the selected data length number 2 at 532. As shown in FIG. 5, the receiver 113 processing is performed on 2 possible data lengths, however, embodiments of the present disclosure are not limited to 2 data lengths.

According to an embodiment of the present disclosure, a transmitter 180 transmits a transport block of physical layer information having a plurality of sub-blocks, wherein each sub-block has an error control code to encode the information data of the respective sub-block. Furthermore, there may be repetitions of one or more sub-blocks by other sub-blocks. This is a generalization to the transmission format used by the MTC physical downlink control channel (MPDCCH). The information data length of each sub-block may be chosen from a set of candidate data lengths. The data length of the total block of information data, and/or the data lengths of each sub-block of information data, may be unknown to the receiver 113. The transmitter 180 may choose to retransmit the same information data multiple times in order to achieve the desired quality of service (QOS) performance. The retransmission may or may not depend on the receiver's 113 feedback signaling such as ACK/NACK to the transmitter 180. The receiver 113 processing methods as described above are applied to the processing operation of each sub-block. When multiple sub-blocks are repetitions of the same part of information data, they will be self-combined and stored in a single HARQ buffer for that part of information data. The operations described with reference to FIGS. 3 to 5 above may be applied to each sub-block (where the HARQ storage is applied to sub-blocks after self-combining if repetitions exist) according to various embodiments of the present disclosure.

For example, a single sub-block HARQ buffer (an individual buffer or a known section of a single HARQ buffer for the entire transport block) is used for each sub-block. The receiver 113 first performs descrambling and deinterleaving operations on the received information data of each sub-block. If this is the first transmission, the information data before rate dematching is stored in the sub-block HARQ buffer. If an ACK/NACK feedback mechanism is used, for each sub-block, rate dematching will be performed multiple times, once for each possible data length, followed by channel decoding and data length selection after decoding for all possible data lengths is completed. If an ACK/NACK feedback mechanism is not used, i.e., retransmission(s) will follow regardless of how the receiver 113 processes the first transmission, then received information data of each sub-block from the first transmission after descrambling and deinterleaving processing is stored but not used for decoding. For retransmissions, the received information data of each sub-block is soft combined with the stored information data from previous transmissions, rate dematched K times, once for each possible data length of each sub-block, and followed by channel decoding. After all K decoding attempts are finished, data length selection will be performed to determine the data length of each sub-block.

According to an embodiment of the present disclosure, a method performed by a receiver includes receiving, coded data from a wireless transmitter, where the coded data includes information data that has been coded by a coding scheme, receiving, a retransmission of the coded data from the wireless transmitter, storing, the coded data, processing, the coded data without knowledge of the data length, and determining, a data length of the information data.

Figure 6:
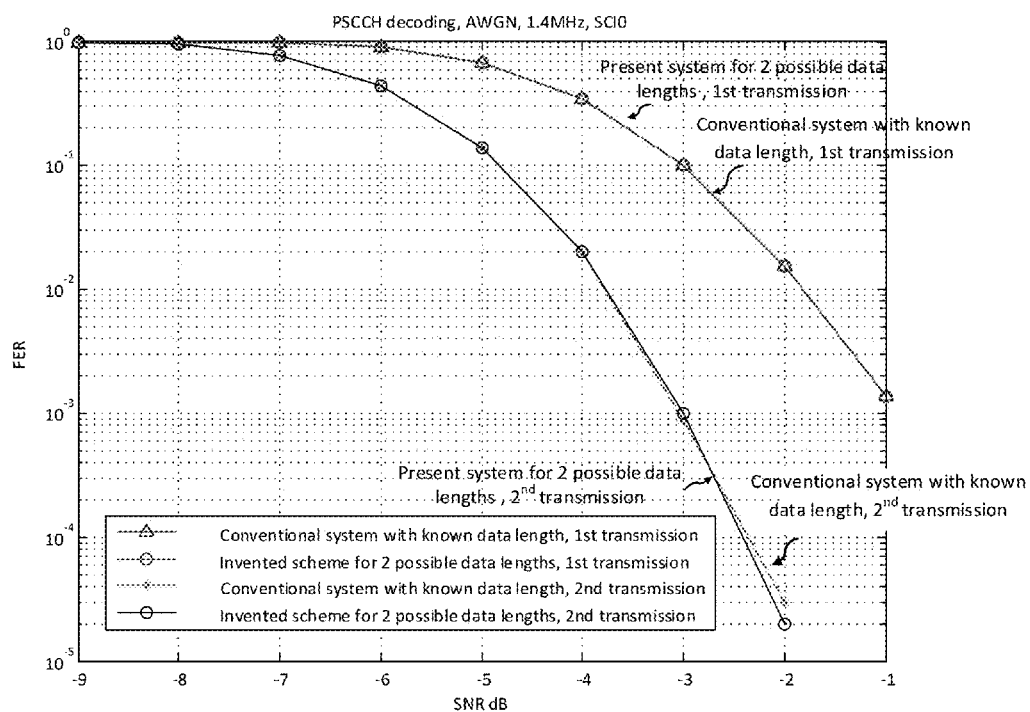
FIG. 6 is a chart illustrating reduced frame error rates in wireless communication due to HARQ processing, according to an embodiment of the present disclosure.

According to an embodiment of the present disclosure, the present system may be tested in the context of decoding a physical side link control channel (PSCCH) in a 3GPP device-to-device (D2D) proximity service environment. A link level simulator for such an environment may be used. The transmitter 180 may choose to send transport blocks with a data length of either 53 bits or 60 bits, including 16 bits for CRC. The transport blocks are encoded by a tail-biting convolutional code with a memory length of 6. The simulation may be carried out in an additive white gaussian noise (AWGN) channel with a 1.4 MHz bandwidth. The present system may be tested where the data has a service class indicator (SCI) format 0 in which a 53 bit data length is used but is unknown to the receiver 113, in comparison with a typical system where the 53 bit data length is known to the receiver 113 and the receiver 113 follows the processing scheme as shown in FIG. 2A. FIG. 6 is a chart illustrating reduced frame error rates (FER) in wireless communication due to HARQ processing, according to an embodiment of the present disclosure. Referring to FIG. 6, the present method and apparatus may reduce frame error rates in a physical shared control channel (PSCCH) operating in the presence of additive white Gaussian noise (AWGN) over a 1.4 megahertz (MHz) bandwidth channel. The FER performance as shown in FIG. 6 indicates the present method achieves the same performance as the conventional system using a known data length.

While the present disclosure has been particularly shown and described with reference to certain embodiments thereof, it will be understood by those of ordinary skill in the art that various changes in forms and details may be made therein without departing from the scope of the present disclosure as defined by the following claims and their equivalents.

What is claimed is:

1. A method comprising:
   receiving, by a receiver, data from a wireless transmitter;
   receiving, by the receiver, retransmission of the data from the wireless transmitter;
   storing, by the receiver, the data in a single hybrid automatic repeat request (HARQ)) buffer associated with a selected data length;
   processing, by the receiver, the data without knowledge of the data length; and
   determining, by the receiver, a data length of the data.

2. The method of claim 1, wherein processing, by the receiver, comprises:
   performing HARQ processing prior to performing rate dematching.

3. The method of claim 1, wherein processing, by the receiver, comprises:
   combining and storing multiple blocks of received data;
   rate dematching the combined and stored blocks of received data for each of multiple data lengths;
   blind decoding the rate dematched blocks of received data for each of the multiple data lengths; and
   determining a data length based on the blind decoded rate dematched blocks of received data.

4. The method of claim 3, wherein determining the data length comprises performing calculations on statistical metrics derived from the blind decoding.

5. The method of claim 1, wherein processing, by the receiver, comprises:
   rate dematching blocks of the received data for each of multiple data lengths;
   combining and storing the rate dematched blocks of received data for each of multiple data lengths;
   blind decoding the combined and stored blocks of received data for each of multiple data lengths; and
   determining the data length based on the blind decoded combined and stored blocks of received data.

6. The method of claim 1, wherein processing, by the receiver, comprises:
   rate dematching blocks of the received data for multiple data lengths;
   blind decoding the rate dematched blocks for each of multiple data lengths; and
   selecting the data length among the multiple data lengths.

7. The method of claim 1, wherein retransmitting the data to the receiver is performed without a negative acknowledgement (NACK) received by the wireless transmitter.

8. The method of claim 1, wherein the wireless transmitter executes a communications protocol associated with at least one of D2D, MTC, 5G, LTE, LTE-A, CDMA, WCDMA, UMTS, WiBro, GSM, Wi-Fi, Bluetooth, and NFC.

9. The method of claim 1, wherein the data is transmitted in transport blocks.

10. A wireless communication device comprising:
    a receiver; and
    a storage, wherein a wireless transmitter transmits data to the receiver and retransmits the data to the receiver, the storage stores the received data in a single hybrid automatic repeat request (HARQ) buffer associated with a selected data length, and the receiver processes the received and stored data without knowledge of a data length and determines the data length of the data.

11. The wireless communication device of claim 10, wherein processing by the receiver comprises:
    performing HARQ processing prior to performing rate dematching.

12. The wireless communication device of claim 10, wherein processing, by the receiver, comprises:
    combining and storing multiple blocks of received data;
    rate dematching the combined and stored blocks of received data for each of multiple data lengths;
    blind decoding the rate dematched blocks of received data for each of the multiple data lengths; and
    determining a data length based on the blind decoded rate dematched blocks of received data.

13. The wireless communication device of claim 12, wherein determining the data length comprises performing calculations on statistical metrics derived from the blind decoding.

14. The wireless communication device of claim 10, wherein processing by the receiver comprises:
    rate dematching blocks of the received data for each of multiple data lengths;
    combining and storing the rate dematched blocks of received data for each of multiple data lengths;
    blind decoding the combined and stored blocks of received data for each of multiple data lengths; and
    determining the data length based on the blind decoded combined and stored blocks of received data.

15. The wireless communication device of claim 10, wherein processing, by the receiver, comprises:
- rate dematching blocks of the received data for multiple data lengths;
- blind decoding the rate dematched blocks for each of multiple data lengths; and
- selecting the data length among the multiple data lengths.

16. The wireless communication device of claim 10, wherein retransmitting the data to the receiver is performed without a negative acknowledgement (NACK) received by the wireless transmitter.

17. The wireless communication device of claim 10, wherein the wireless transmitter executes a communications protocol associated with at least one of D2D, MTC, 5G, LTE, LTE-A, CDMA, WCDMA, UMTS, WiBro, GSM, Wi-Fi, Bluetooth, and NFC.

18. The wireless communication device of claim 10, wherein the data is transmitted in transport blocks.

19. A chipset for controlling a user equipment (UE) in a mobile communication system, the chipset configured to:
- receive data transmitted by a wireless transmitter;
- receive the data retransmitted by the wireless transmitter
- store the data in a single hybrid automatic repeat request (HARQ) buffer associated with a selected data length;
- process the data without knowledge of the data length; and
- determine a data length of the data.

20. The chipset of claim 19, wherein the mobile communication system is at least one of D2D, MTC, 5G, LTE, LTE-A, CDMA, WCDMA, UMTS, WiBro, GSM, Wi-Fi, Bluetooth, and NFC.

* * * * *